United States Patent
Aranzulla et al.

(10) Patent No.: US 11,390,240 B2
(45) Date of Patent: Jul. 19, 2022

(54) FRONT-HEAD/CHEST AIRBAG

(71) Applicant: TRW AUTOMOTIVE GMBH, Alfdorf (DE)

(72) Inventors: Daniele Aranzulla, Essingen (DE); Martin Burkhardtsmaier, Schwäbisch Gmünd (DE); Kurt Fischer, Leonard, MI (US); Angelo Adler, Washington, MI (US); Alexandra Schroeder, Lenox, MI (US)

(73) Assignee: TRW AUTOMOTIVE GMBH, Alfdorf (DE)

(*) Notice: Subject to any disclaimer, the term of this patent is extended or adjusted under 35 U.S.C. 154(b) by 714 days.

(21) Appl. No.: 15/565,447

(22) PCT Filed: Apr. 18, 2016

(86) PCT No.: PCT/EP2016/000627
§ 371 (c)(1),
(2) Date: Oct. 10, 2017

(87) PCT Pub. No.: WO2016/169643
PCT Pub. Date: Oct. 27, 2016

(65) Prior Publication Data
US 2018/0126945 A1 May 10, 2018

(30) Foreign Application Priority Data
Apr. 20, 2015 (DE) .................... 10 2015 004 973.9

(51) Int. Cl.
*B60R 21/233* (2006.01)
*B60R 21/2338* (2011.01)
(Continued)

(52) U.S. Cl.
CPC ........ *B60R 21/233* (2013.01); *B60R 21/2338* (2013.01); *B60R 21/23138* (2013.01);
(Continued)

(58) Field of Classification Search
CPC ........ B60R 2021/23382; B60R 21/233; B60R 2021/23571
See application file for complete search history.

(56) References Cited

U.S. PATENT DOCUMENTS 6,832,780 B2   12/2004   Amamori
8,955,879 B2 *  2/2015   Aranzulla ............. B60R 21/231
                                                 280/743.1
(Continued)

FOREIGN PATENT DOCUMENTS

JP   H0332988    2/1991
JP   H08324373   12/1996
(Continued)

*Primary Examiner* — Nicole T Verley
(74) *Attorney, Agent, or Firm* — Tarolli, Sundheim, Covell & Tummino LLP

(57) ABSTRACT

A front head/torso airbag (10) of a vehicle occupant restraint system includes a cover surface (12) and a baffle surface (14) forming a contact face for the vehicle occupant (22) which merges Into the cover surface (12). In the inflated state of the airbag (10) being in the mounted position, the baffle surface (14) includes a central surface portion and laterally adjacent thereto at feast one bulge (20) projecting from the central surface portion for laterally protecting the head (24).

14 Claims, 14 Drawing Sheets

(51) Int. Cl.
*B60R 21/231* (2011.01)
*B60R 21/00* (2006.01)

(52) U.S. Cl.
CPC ............... *B60R 2021/0004* (2013.01); *B60R 2021/0044* (2013.01); *B60R 2021/0048* (2013.01); *B60R 2021/23308* (2013.01); *B60R 2021/23382* (2013.01); *B60R 2021/23386* (2013.01)

(56) References Cited

U.S. PATENT DOCUMENTS

| | | | | |
|---|---|---|---|---|
| 9,358,945 | B2 * | 6/2016 | Yamada | B60R 21/233 |
| 9,505,372 | B2 * | 11/2016 | Yamada | B60R 21/2338 |
| 9,573,555 | B2 * | 2/2017 | Jang | B60R 21/233 |
| 9,758,123 | B2 * | 9/2017 | Yamada | B60R 21/2338 |
| 9,908,498 | B2 * | 3/2018 | Luna Nell | B60R 21/205 |
| 10,279,769 | B2 * | 5/2019 | Nakanishi | B60R 21/203 |
| 10,315,610 | B2 * | 6/2019 | Moritani | B60R 21/233 |
| 10,384,635 | B2 * | 8/2019 | Aranzulla | |
| 2002/0185846 | A1 | 12/2002 | Neupert et al. | |
| 2005/0275201 | A1 | 12/2005 | Schneider et al. | |
| 2006/0131847 | A1 | 6/2006 | Sato et al. | |
| 2006/0163848 | A1 | 7/2006 | Abe | |
| 2007/0045997 | A1 | 3/2007 | Abe et al. | |
| 2011/0068564 | A1 | 3/2011 | Miyata | |
| 2012/0098242 | A1 * | 4/2012 | Aranzulla | B60R 21/231 280/743.1 |
| 2013/0001934 | A1 | 1/2013 | Nagasawa et al. | |
| 2017/0305380 | A1 * | 10/2017 | Tsujimoto | B60R 21/205 |
| 2017/0355344 | A1 * | 12/2017 | Choi | B60R 21/231 |
| 2017/0369023 | A1 * | 12/2017 | Aranzulla | B60R 21/231 |
| 2018/0065587 | A1 * | 3/2018 | Maenishi | B60R 21/205 |

FOREIGN PATENT DOCUMENTS

| | | | |
|---|---|---|---|
| JP | 2006111255 | | 4/2006 |
| JP | 2013112015 A | * | 6/2013 |
| JP | 5337583 B2 | * | 11/2013 |
| JP | 5491332 B2 | * | 5/2014 |
| JP | 2017061230 A | * | 3/2017 |
| JP | 6347185 B2 | * | 6/2018 |

* cited by examiner

FRONT-HEAD/CHEST AIRBAG

RELATED APPLICATIONS

This application corresponds to PCT/EP2016/000627, filed Apr. 18, 2016, which claims the benefit of German Application No. 10 2015 004 973.9, filed Apr. 20, 2015, the subject matter, of which are incorporated herein by reference in their entirety.

BACKGROUND OF THE INVENTION

The invention relates to a front head/torso airbag of a vehicle occupant restraint system.

An as comprehensive protection of the head and the torso (upper body part) of a vehicle occupant is desired for different types of frontal collisions, inter alia a partly offset frontal crash.

SUMMARY OF THE INVENTION

It is the object of the invention to provide an improved airbag which offers appropriate protection especially in the case of frontal car collisions with little overlapping.

In accordance with the invention, this is achieved by a front head/torso airbag of a vehicle occupant restraint system that includes a cover surface and a baffle surface forming a contact face tor the vehicle occupant which merges into the cover surface. The baffle surface includes, in the inflated state of the airbag in the mounting position thereof, a central surface portion as well as, laterally adjacent thereto, at least one bulge projecting from the central surface portion for laterally protecting the head. In the case of transverse accelerations within the scope of a frontal crash, the bulge extending in the direction of the vehicle rear end absorbs the head of the vehicle occupant and supports the same. In this way, a rotational movement of the head may be reduced and the stress of the cervical spine may be lowered.

The baffle surface is advantageously configured so that, when the vehicle occupant contacts the central surface portion, the at least one bulge is located at the side of the occupant's heed. In this manner the front head/torso airbag (hereinafter also abbreviated to "airbag") offers proper support of the head.

It has turned out that it is favorable when the bulge is located in a central area of the vertical longitudinal extension of the baffle surface related to the inflated state of the airbag in the mounted position. Accordingly, the major part of the bulge may be located beneath the head and support the vehicle occupant.

In a preferred embodiment, two bulges are provided which are arranged on opposite sides of the central surface portion and which are facing each other so that the head may be supported toward both sides.

It is also possible, however, to provide only one single bulge which, in the mounted position of the airbag, then is preferably located on the side thereof directed toward the vehicle interior.

The cover surface may be formed of one single cut part.

According to a preferred embodiment, the baffle surface is composed, however, of at least two out parts each being delimited by a portion of a peripheral edge of the baffle surface as well as by at least one inner edge on which the out parts of the baffle surface are fastened to each other. Each of the inner edges facing each other of neighboring cut parts of the baffle surface includes a convex area, and said convex area helps to define the bulge. Along the peripheral edge the baffle surface is connected to the cover surface, for example by a seam.

Each of the cut parts, both for the cover surface and for the baffle surface, can preferably be flatly spread per se, i.e. is not woven three-dimensionally or includes darts.

The convex areas of the inner edges are configured so that they provide for excess material as compared to a cut in the case of which the inner edges form a flat two-dimensional baffle surface. This excess material is used to produce the bulge.

Along the peripheral edge preferably the baffle surface can still be spread flatly and two-dimensionally so that drape and non-uniform stresses can be avoided in the case of connection to the cover surface.

The convex area can extend at least 50 mm away from an imaginary line through the intersections of the inner edge of the respective cut part with the portion of the peripheral edge of the same cut part. It has turned out that a sufficiently large bulge can be created by material allowance of about 50 to 150 mm.

The bulge is preferably formed in total by such large material allowance that in the inflated state of the airbag it projects from the adjacent central surface portion by at least 50 mm.

The baffle surface may be composed of exactly two cut parts. It is also possible to compose the baffle surface of exactly three cot parts. A baffle surface made from more than three cut parts is also possible, but the work expenditure is increased vis-à-vis a baffle surface made from fewer single parts.

In a baffle surface composed of three out parts preferably each of the cut parts has an inner edge including a convex area. Thus, from the two connecting seams of the three cut parts two bulges are resulting which are arranged at a distance from each other laterally next to the central surface portion of the baffle surface. The bulge is located laterally close to a transition of the baffle surface into the cover surface and, resp., laterally close to the peripheral edge of the baffle surface.

The central cut part of the baffle surface may be formed mirror-symmetrically to an imaginary center line along the vertical direction of the baffle surface, whereas the two outer cut parts may be formed mirror-symmetrically relative to each other.

Preferably, a tether is provided which interconnects two wall portions of the bulge, especially two cut parts of the baffle surface in the area of the bulge. The tether supports shaping by maintaining the wall portions in the area of the bulge at a predetermined distance from each other and thus facilitates providing a bulge having sufficient extension perpendicularly to the baffle surface.

This tether preferably extends in the interior of the airbag and hereinafter will be referred to as "inner tether".

The mounting points of the inner tether at the wall portions of the bulge are preferably located at a transition from the baffle surface into the bulge and may help to define said transition.

For three out parts for the baffle surface preferably two inner tethers are provided which ere arranged identically but mirror-inverted at each of the two bulges.

A positive effect can be achieved when the inner tether is fastened in the area of an imaginary line through the intersections of the inner edge of the cut part with a portion of the peripheral edge of the assigned cut part. Such imaginary line extends in such way as the inner edges of a baffle surface composed of plural cut parts would extend, if the finished baffle surface were adapted to be flatly spread. An arrangement of the inner tethers in this area ensures that the bulges will extend away from the baffle surface in a well-directed manner, while the peripheral edge of the baffle surface is not distorted by tensile loads inside the baffle surface.

Alternatively or additionally, a tether may be provided on the outside of the airbag (hereinafter also referred to as "outer tether") which, on the one band, is fixed to the bulge as well as, on the other hand, to the baffle surface or in the area of a transition from the baffle surface to the cover surface, especially at the peripheral edge.

It is possible to fix the outer tether in the area of an outermost position of the bulge, related to the inflated airbag.

The outer tether may be fixed, e.g., to the convex area of the inner edges of the cut parts as well as on the central surface portion. At the cut parts, the outer tether is fastened especially at the position most distant from the central surface portion of the baffle surface at two adjacent out parts, preferably at the connection of the two cut parts to each other, in the inflated airbag, the outer tether thus acts externally at the outermost position of the bulge which is most distant from the baffle surface and connects the same e.g. to the central surface portion of the baffle surface.

While the vehicle occupant is in contact with the airbag, the outer tether generates a counterforce pulling the bulge toward the middle of the central portion of the baffle surface and thus increasing the supporting effect on the head.

This is equally possible when the baffle surface is composed of three cut parts, wherein preferably the outer tether is fixed in a central portion at the baffle surface as well as with its two ends in the area of the two bulges. The outer tether is preferably fastened to the central cut part and at each of the inner edges of adjacent cut parts fastened to each other, with the fastening of the outer tether to the inner edges at the convex area of the inner edge being especially fixed to the position most distant from the central surface portion of the baffle surface.

Related to the cut, the preferred fixing point of the outer tether corresponds to the point which is spaced apart most largely from the imaginary center line between the intersections of the respective inner edge with the respective peripheral edge portion of the cut part which is related to the flatly spread cut.

It is also possible to fix the outer tether at the bulge between the outermost position and the transition of the bulge into the baffle surface, related to the inflated airbag, so that the bulges in the direction away from the baffle surface project from the fastening points of the outer tether.

The fixing point at the central cut part is preferably located on the already mentioned Imaginary center line of the baffle surface in the spread state of the cut which also corresponds to the central surface portion of the baffle surface. Each of the tethers preferably extends approximately perpendicularly to this center line.

In general, the outer tether may extend independently of the shape of the cut parts between two bulges, wherein preferably each of the two free ends of the tether are fixed to either of the bulges.

The outer tether may be fastened between its ends additionally to the baffle surface, but it may extend freely between the two bulges even without any further fixation.

In a preferred embodiment, tethers that extend inside end outside are provided. It would also be possible, however, to make use of tethers extending inside only or outside only, as described above.

As an alternative or in addition to the use of the tethers, cut parts of the baffle surface adjacent in the area of the beige may be fastened directly to each other at a joint. The joint may be formed, for example, by a seam, a gluing or welding. At the joint the adjacent cut parts are preferably located directly on top of each ether so that a non-inflated area is formed which may partly separate an outer area of the bulge in the form of a compartment from the residual airbag volume.

In the inflated state of the airbag, the bulge may be bent at the joint in the direction of the middle of the central surface portion of the baffle surface, which can be backed especially by the effect of the tethers arranged on the outside. For this purpose, the joint advantageously extends approximately in parallel to the baffle surface. The curvature of the bulge obtained in this way in the direction of the middle of the central surface portion and thus in the direction of the head of the vehicle occupant equally backs the supporting and absorbing effect for the head of the vehicle occupant.

It is also possible to arrange the joint approximately perpendicularly to the baffle surface so as to achieve the effect to the contrary and to stabilize the bulges.

The airbag according to the invention is especially suited for use as a passenger airbag, but it could as well be used as driver airbag, for example.

BRIEF DESCRIPTION OF THE DRAWINGS

Hereinafter the invention shall be described in detail by way of plural embodiments with reference to the enclosed drawings, wherein.

DESCRIPTION

Figure 1:
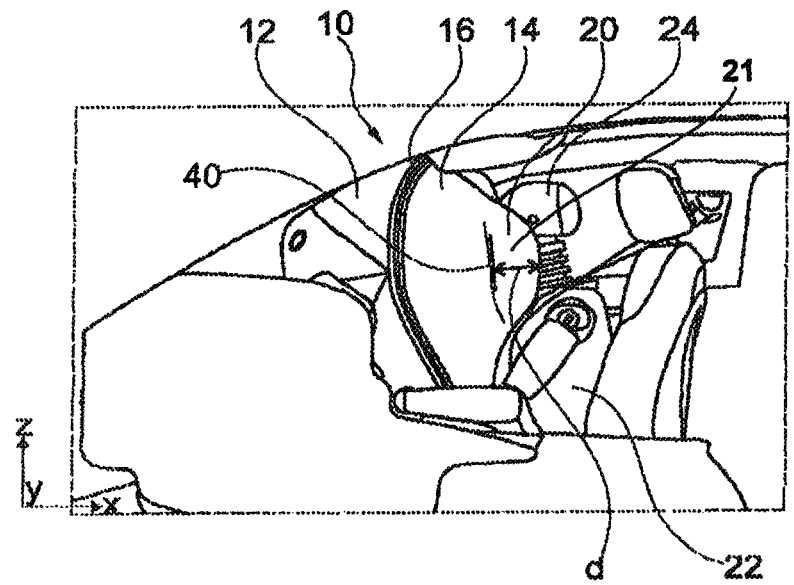
FIG. 1 illustrates a schematic perspective representation of a front head/torso airbag according to the invention mounted in a vehicle in the inflated state in accordance with a first embodiment in a side view in an impact situation.
Figure 2:
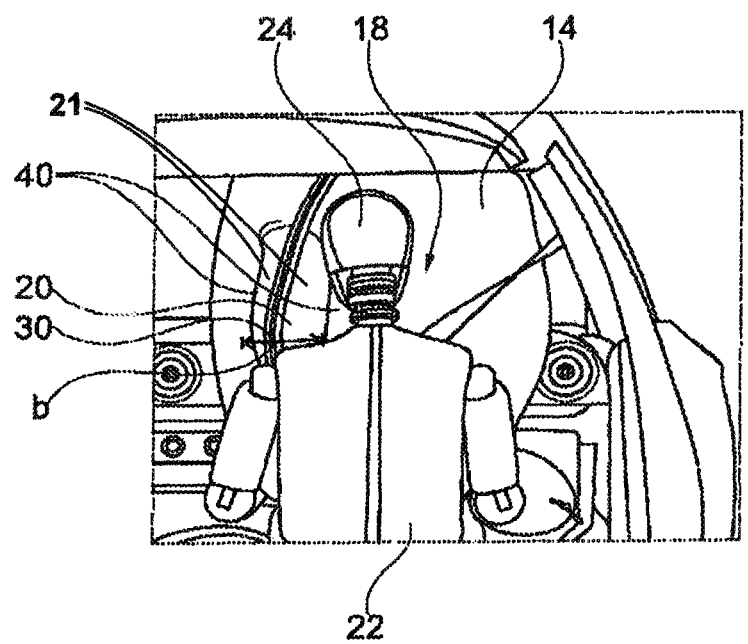
FIG. 2 shows the airbag of FIG. 1 in a schematic view from behind.
Figure 3:
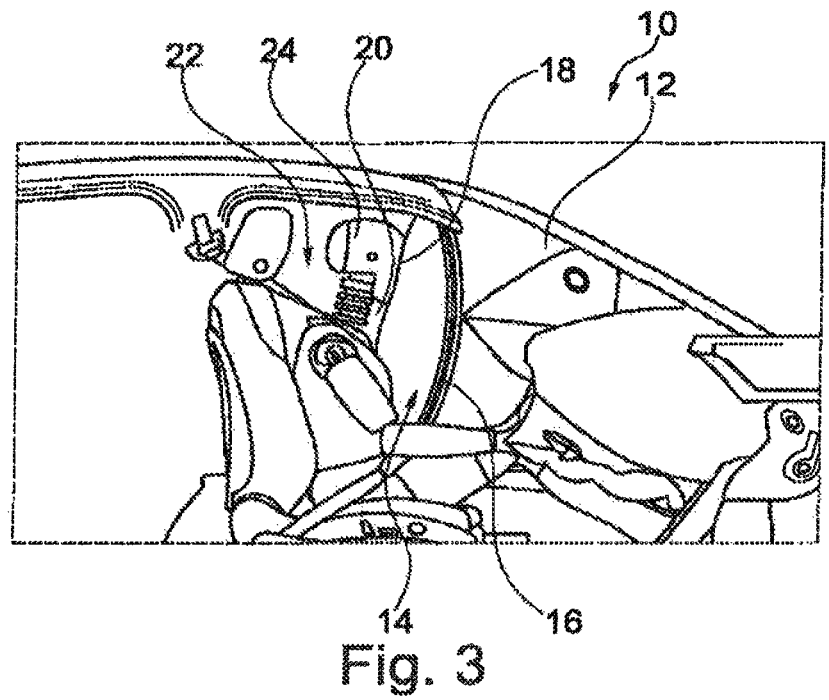
FIG. 3 shows a schematic side view of the airbag of FIG. 1 viewed from the door side of the vehicle.
Figure 4:
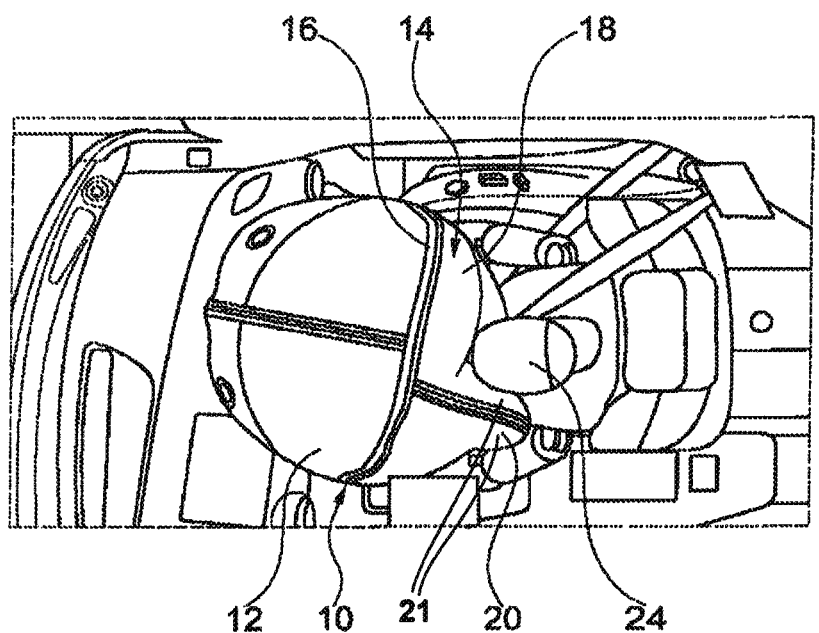
FIG. 4 shows a schematic perspective view of the airbag of FIG. 1 in a top view.

FIGS. 1 to 5 illustrate a front head/torso airbag 10 (hereinafter also abbreviated to "airbag") according to a first embodiment.

In FIGS. 1 to 4 the airbag 10 is shown while being mounted in a vehicle in the inflated state during a collision situation, which may be a frontal collision with little overlapping.

The airbag 10 in this example is designed as a passenger airbag. It has a cover surface 12 and a baffle surface 14 which merges into the cover surface 12, wherein in these examples the baffle surface 14 is connected to the cover surface 12 at each peripheral edge 16.

The baffle surface 14 has a central surface portion 18 as well as a bulge 20 laterally adjacent to the central surface portion 18 and projecting from the same to the rear, i.e. directed into the vehicle interior. The bulge has two opposite wall portions 21 that project from the baffle surface 14.

The baffle surface 14 forms a contact face for a vehicle occupant 22, a dummy in this case, the latter immersing into the central surface portion 18 of the baffle surface 14 with his/her head 24 and thorax region. In this situation of contact the bulge 20 is located at the side of the head 24 of the vehicle occupant 22 and protects the latter against a lateral movement and effectuates a support which also reduces rotation of the head 24.

The bulge 20 extends over a distance d into the vehicle interior in the direction of the vehicle occupant 22 and away from the baffle surface 14, especially away from the central surface portion 18. The distance d in this case is selected to be larger than 50 mm.

Figure 5:
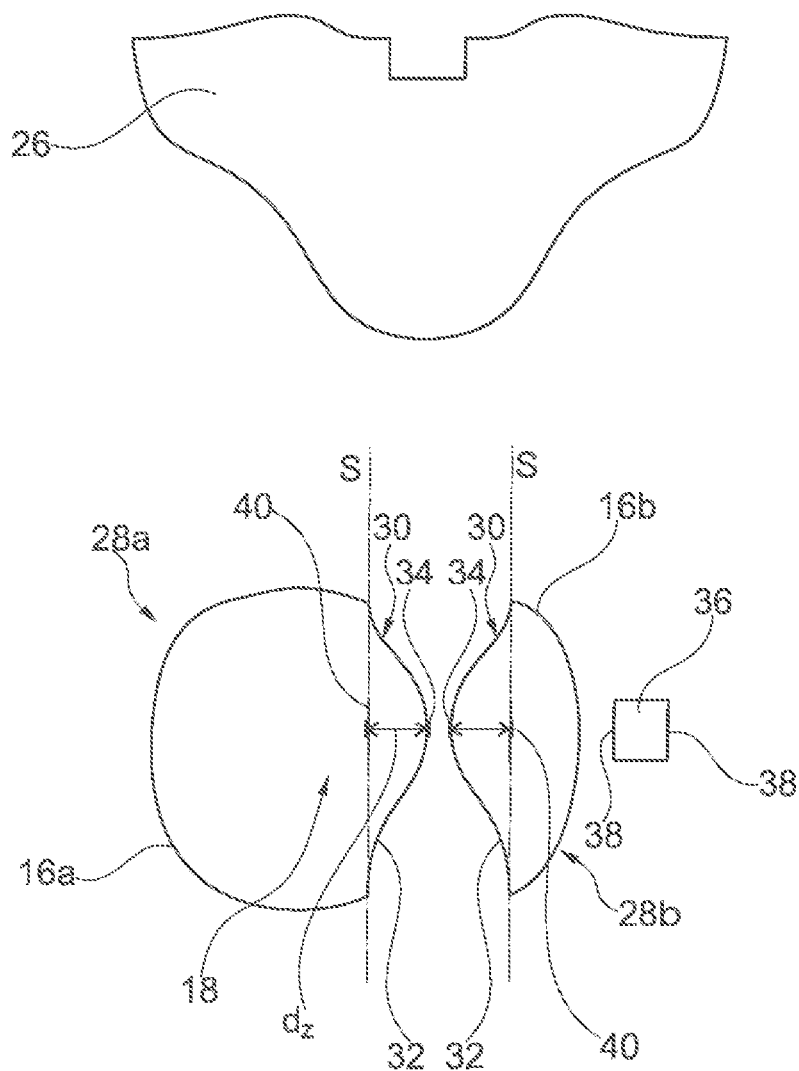
FIG. 5 shows the flatly spread cut parts of an airbag according to the invention in accordance with the first embodiment.

FIG. 5 illustrates the flatly spread cut parts of the airbag 10. The outer wall of the airbag 10 is formed by three cut parts, viz. a cover part 26 as well as two cut parts 28a, 28b which jointly form the baffle surface 14. Each of the cut parts 28a, 28b of the baffle surface 14 is delimited by a portion 16a, 16b of the later peripheral edge 16 of the completely assembled baffle surface 14 as well as by an inner edge 30 later extending in the area of the baffle surface 14. Each of the cut parts 28a, 28b includes, at its inner edge 30, a convex outwardly bulged area 32 which helps to define the bulge 20 in the finished inflated airbag 10.

When in the spread state of the cut parts an imaginary line S is formed between the intersection of the respective portion of the outer periphery 16a, 16b and the respective inner edge 30, the distance $d_z$ from the intersecting line S to a point 34 most distant from the intersecting line S in the convex area 32 of the inner edge 30 is selected such that the desired depth d of the bulge 20 is resulting in the completely inflated airbag 10.

The two cut parts 28a, 28b are completely connected, for example sewn, glued or welded to each other along their inner edges 30 so that a continuous baffle surface 14 is formed by the two cut parts 28a, 28b. Along the peripheral edge 18 which in such case is continuously circumferential and is composed of the peripheral edge portions 18a, 16b, the combined cut part is connected to the cover part 26 to form the finished airbag 10.

In addition, an inner tether 36 is provided which in this case is made from a rectangular piece of fabric and which is arranged inside the airbag 10. The tether 36 is fastened by opposite ends 38 on the surface of each of the cut parts 28a, 28b in a respective area 40 along the imaginary line S and opposed to the outermost point 34.

The extension of the inner tether 36 is dimensioned so that in the inflated airbag 10 the inner tether 36 exerts tension on the two cut parts 28a, 28b. The width b of the bulge 20 in the inflated state is substantially defined by the length of the inner tether 36 (cf. also FIG. 2).

Figure 6:
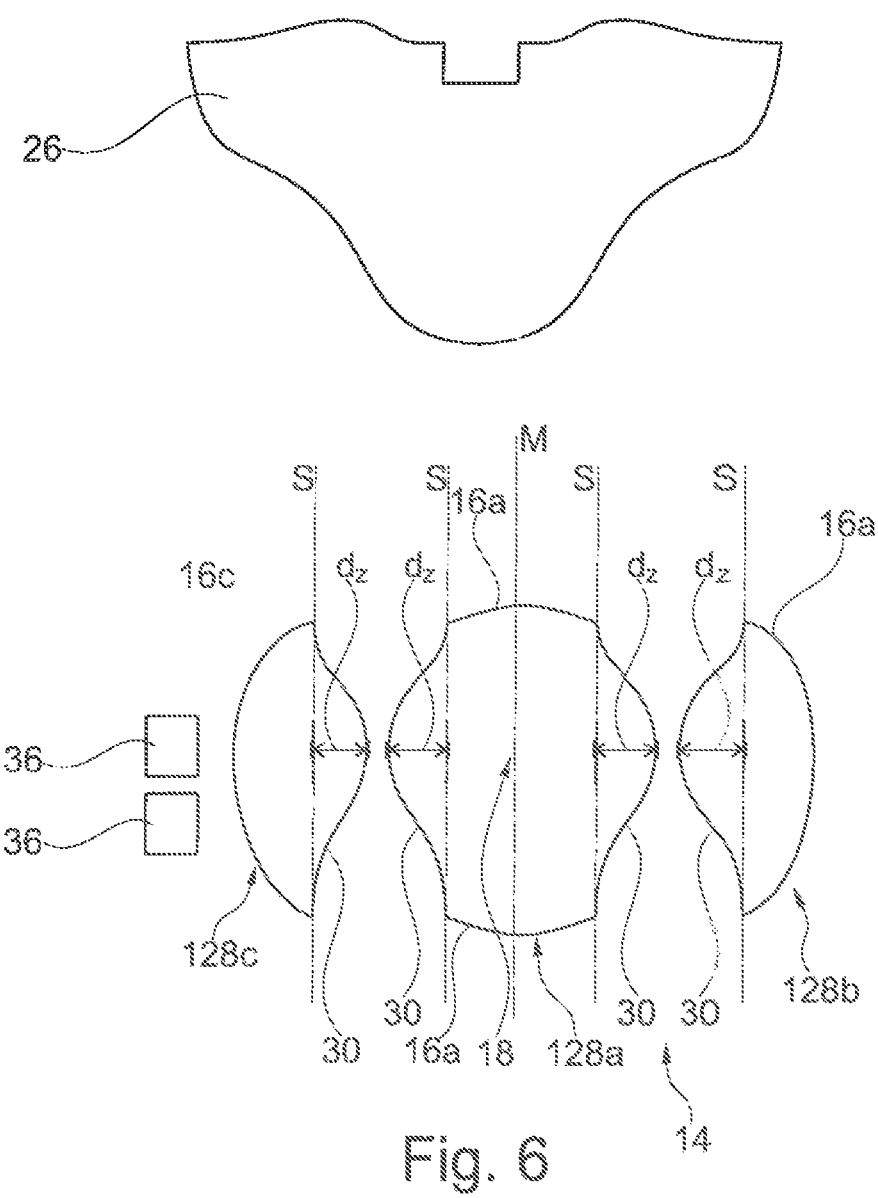
FIG. 6 shows the flatly spread cut parts of an airbag according to the invention in accordance with a second embodiment.

FIG. 6 illustrates a second embodiment of a front head/torso airbag in which the baffle surface 14 is composed of a total of three cut parts 128a, 126b, 128c. The central cut part 128a is mirror-symmetrical along an imaginary center line M along the vertical direction of the baffle surface 14 in the inflated airbag in the mounted position. The two outer out parts 128b, 128c are mirror-inverted with respect to the center line M.

Each of the two outer out parts 128b, 128c is substantially identical to the afore-described outer cut pert 28b. The inner edges 30 of the central cut part 128a correspond (mirror-inverted on one side) to the inner edge 30 of the afore-described cut part 28a.

When the cut parts 128a and 128b are joined at their respective inner edges 30 and the cut parts 128a and 128c are joined at their respective inner edges 30, a baffle surface 14 having two bulges 20 on each side of the central surface portion 18 of the baffle surface 14 is formed.

Just as in the first embodiment, inner tethers 36 are provided that are fixed in the area of the intersecting lines S at an area 40 on the cut parts 128a, 128b and 128a, 128c so as to delimit the width b of the respective bulge 20 (cf. also FIGS. 1 to 4 shown there for the embodiment having one single bulge 20 only).

Just as in the first embodiment, the individual out parts 128a to 128c of the baffle surface 14 are assembled at the inner edges 30 and are connected to the cover part 28 which is identical to the cover part 26 of the first embodiment. Moreover, the two inner tethers 36 are fastened in the interior of the airbag.

Figure 7:
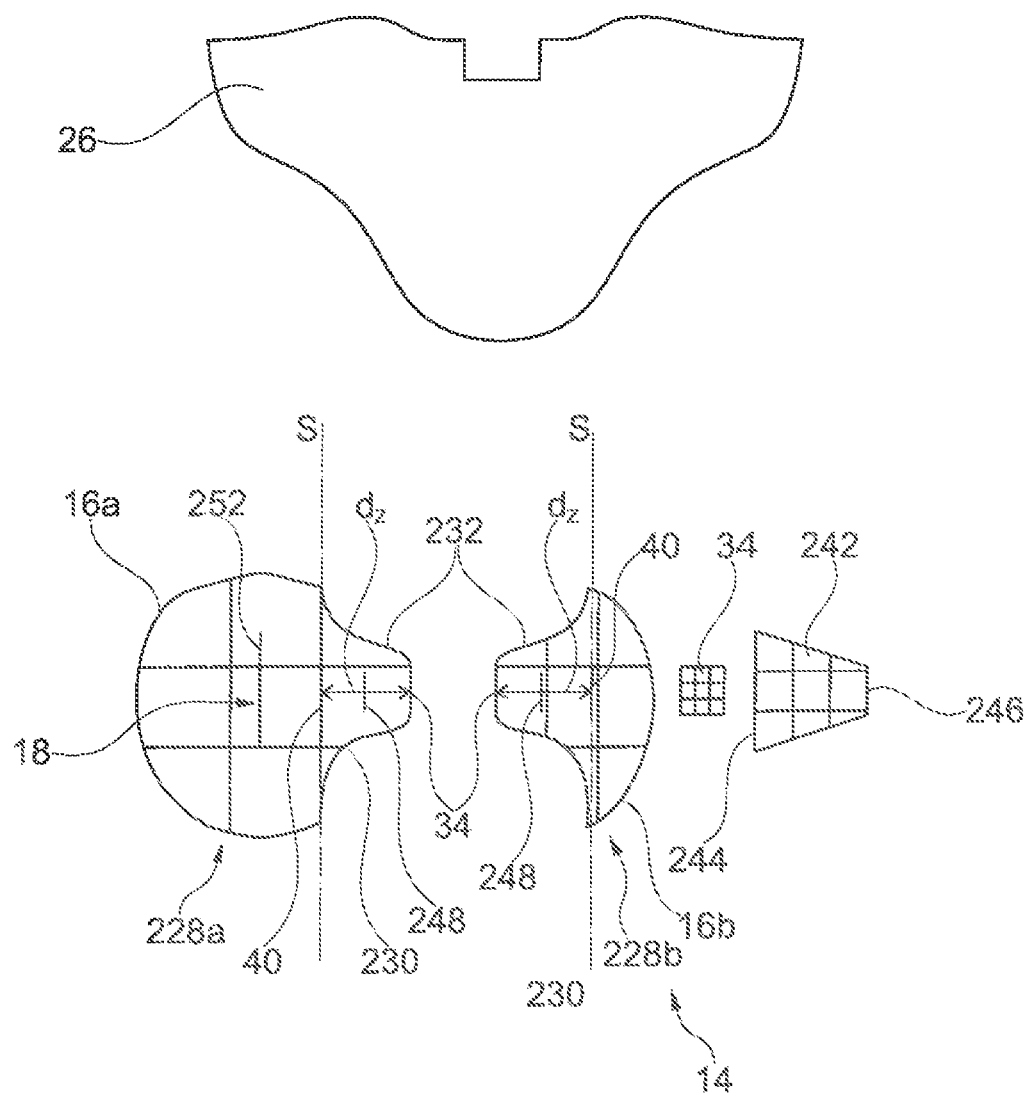
FIG. 7 shows the flatly spread cut parts of an airbag according to the invention in accordance with a third embodiment.
Figure 8:
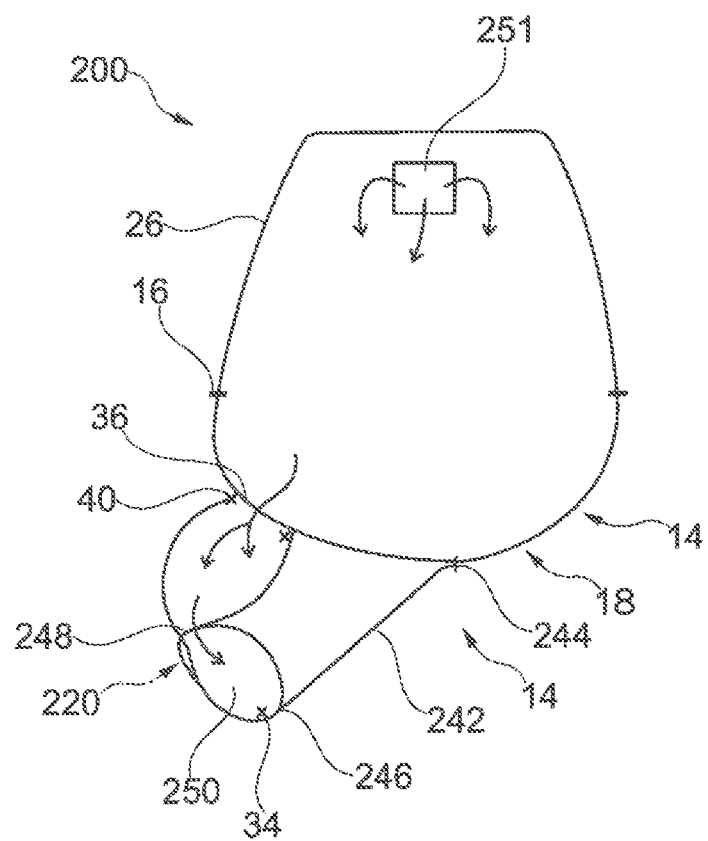
FIG. 8 shows a schematic top view onto the airbag assembled of the cut parts of FIG. 7 in the inflated state.

FIGS. 7 to 8 illustrate a third embodiment of a front head/torso airbag 200. In FIG. 7, the flatly spread cut parts of the airbag 200 are evident, the latter being shown in the assembled and inflated state in FIGS. 8 and 9.

The cover part 28 is identical to that of the previous embodiments.

The battle surface 14 of the airbag 200 is composed of two out parts 228a, 228b. Just as in the first embodiment, each of the cut parts 228a, 228b includes a portion of the peripheral edge 216a, 216b as well as an inner edge 230. At the inner edges 230 the two cut parts 228a, 228b are connected to each other over the entire length of the inner edge 230 and, in this way, form the baffle surface 14. Each of the inner edges 230 has a convexly shaped area 232, with the convexly shaped areas 232 being formed to be mirror-inverted relative to each other.

The points 34 of the convex areas 232 that are most distant from an imaginary intersecting line S of the inner edges 230 with the peripheral edge portions 16a, 16b have a larger distance $d_z$ from the imaginary line S than in the preceding embodiments. The distance $d_z$ may be larger than 75 mm or even larger than 100 mm.

Just as in the previously described embodiments, there is provided an inner tether 36 which in an area 40 of the imaginary line S is fastened by each of its ends on one of the out pads 228a, 228b and interconnects the latter in the interior of the airbag 200.

In addition, a second outer tether 242 fastened on the outside of the airbag 200 is provided. One end 244 of the outer tether 242 is fastened on the surface of the cut part 228a, especially in the area of the central surface portion 18 of the baffle surface 14. The other end 246 of the outer tether 242 is fastened at the inner edge 230 of both out parts 228a, 228b inside the convex area 232, in this example, the fastening point is located at the point 34, viz, in the inflated airbag at the outermost point 47 of the bulge 220. The end 246 of the outer tether 242 is fastened by the connection of the two cut parts 228a, 228b to the latter, for example by the seam connecting the same. The outer tether 242 has a trapezoidal shape in this case, wherein the end 244 fastened on the central surface portion 18 is longer than the end 246 fixed between the inner edges 230.

Figure 9:
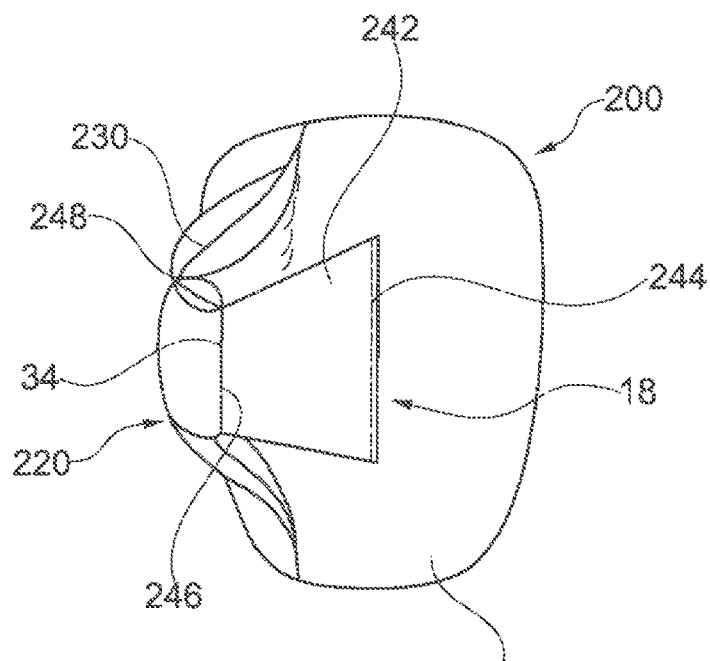
FIG. 9 shows the airbag of FIG. 8 in a schematic perspective representation.

In the inflated airbag 200, the outer tether 242 pulls the outermost tip of the bulge 220 in the direction of the central surface portion 18 of the battle surface 14, as is illustrated in FIGS. 8 and 9. In this manner, the supporting effect for the head 24 of the vehicle occupant 22 is increased.

In addition, the two cut parts 228a, 228b are directly connected, for example sewn, glued or welded to each other at a joint 248. The joint 248 is located on the cut parts 228a, 228b between the points 34, viz. the attachment point of the second end 246 of the second tether 242 and the area 40 in which the first tether 36 is fixed. The pint 248 creates a small compartment 250 partly separated from the residual volume of the airbag 200 at the upper end of the bulge 220.

In the inflated airbag 200, the bulge 220 is bent at the joint 248, namely in the direction of the central surface portion 18 of the baffle surface 14. Such bending is backed by the tension of the outer tether 242. This is resulting in a shape of the bulge 220 curved toward the head 24 of the vehicle occupant 22 which enhances the support of the head 24.

Figure 10:
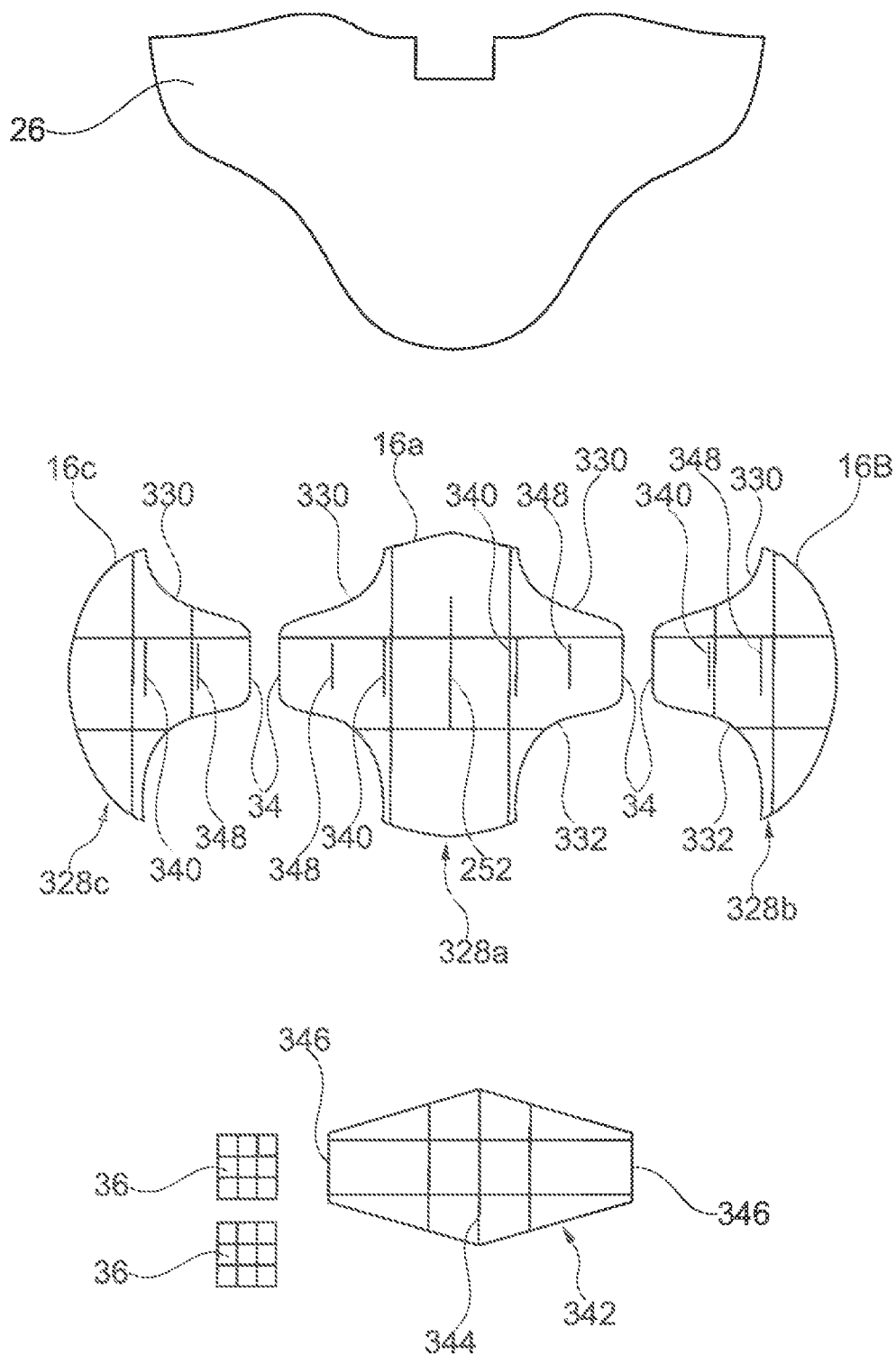
FIG. 10 shows the cut parts of an airbag according to the invention in accordance with a fourth embodiment.
Figure 11:
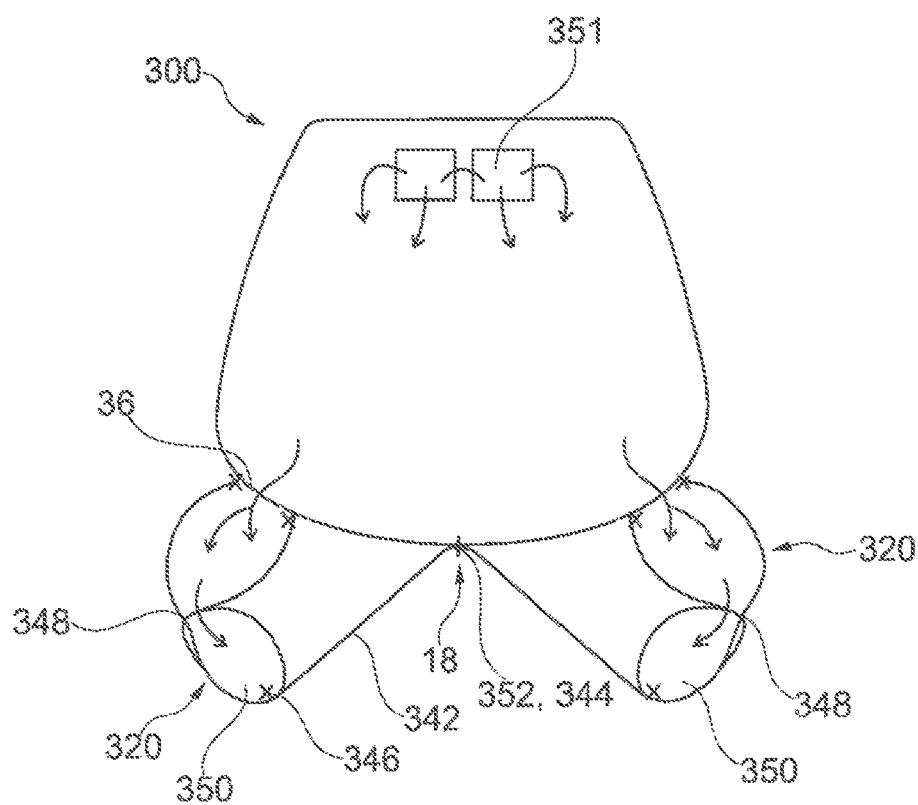
FIG. 11 is a schematic top view onto the airbag assembled of the cut parts of FIG. 10 in the inflated state.
Figure 12:
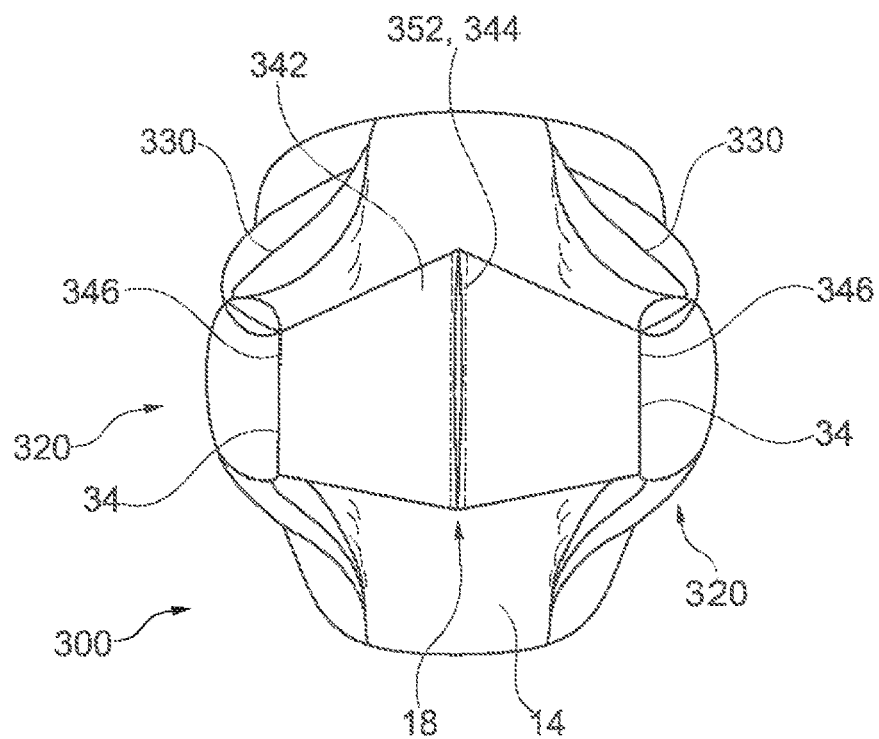
FIG. 12 shows the airbag of FIG. 11 in a schematic perspective view.
Figure 13:
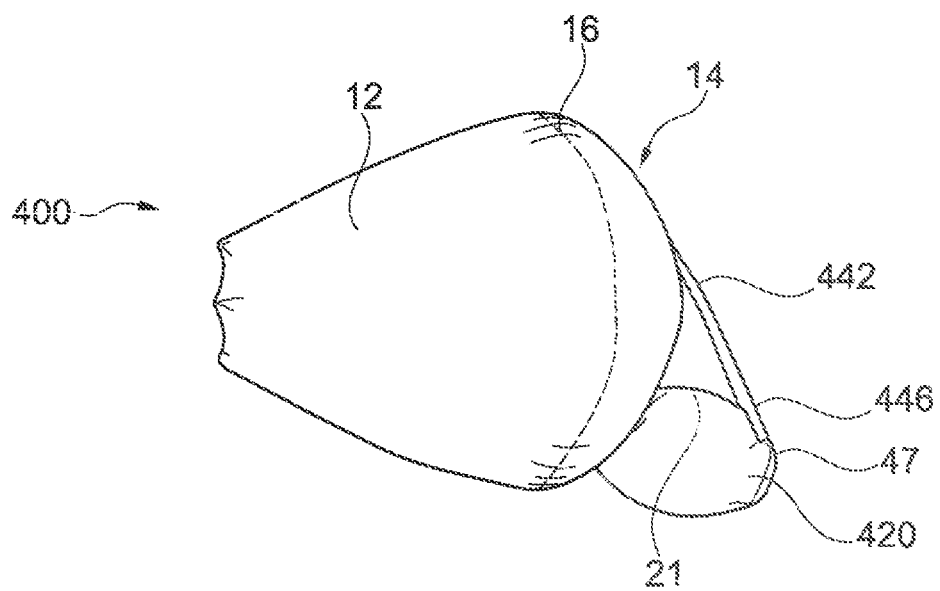
FIGS. 13 to 16 show schematic perspective views of an airbag according to the invention in an inflated state in accordance with a fifth embodiment.
Figure 14:
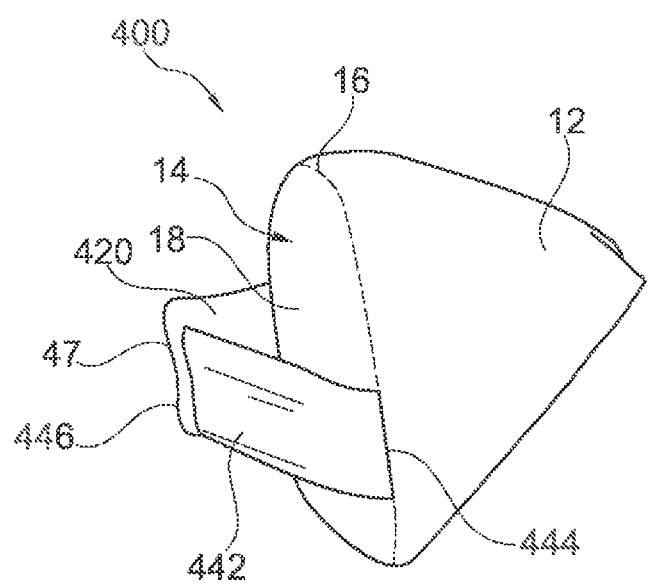
Figure 15:
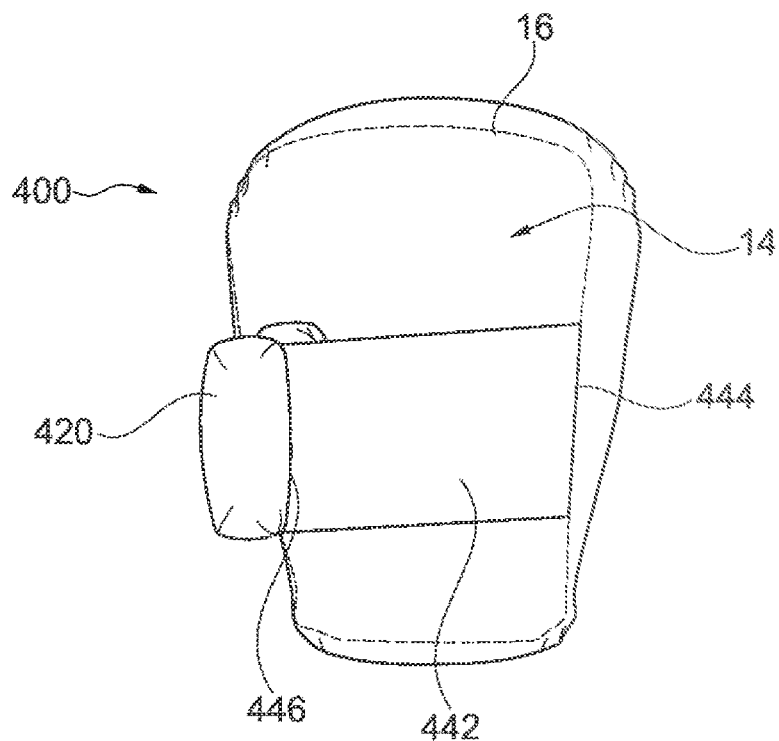
Figure 16:
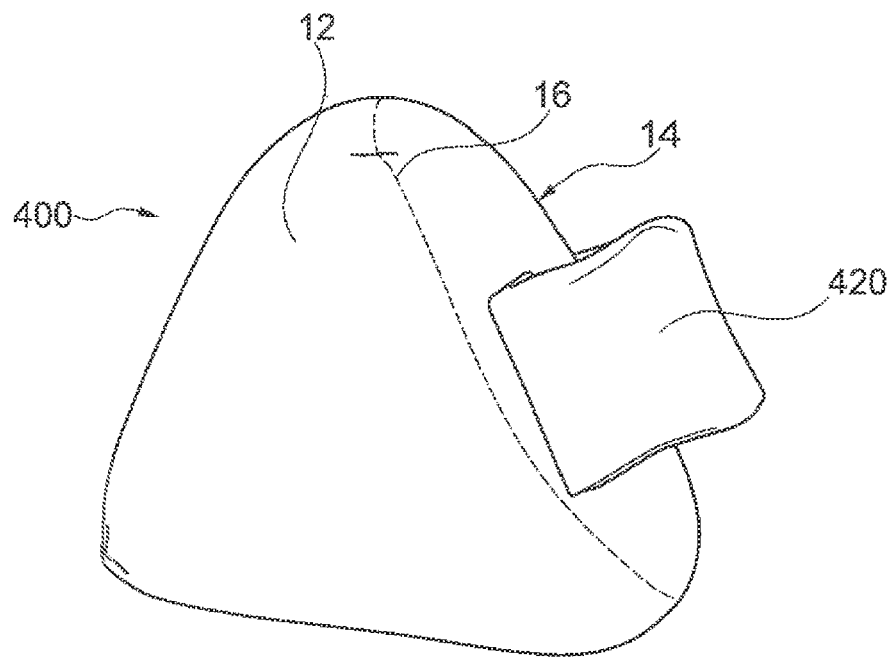
Figure 17:
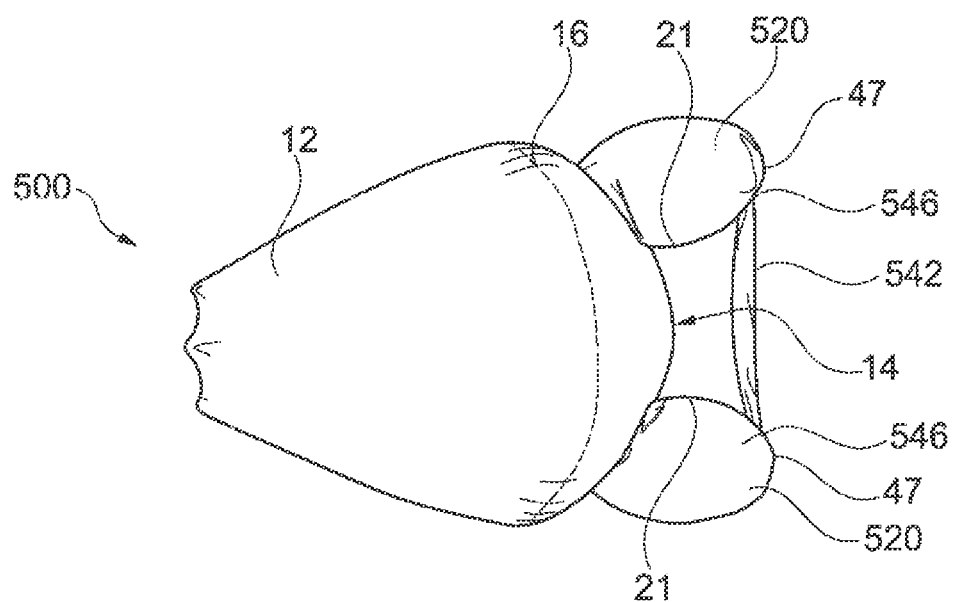
FIGS. 17 to 20 show schematic perspective views of an airbag according to the invention in the inflated state in accordance with a sixth embodiment.
Figure 18:
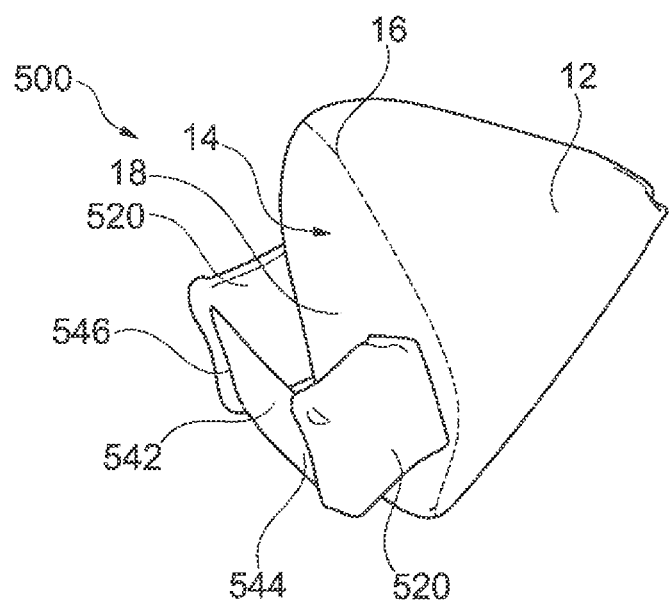
Figure 19:
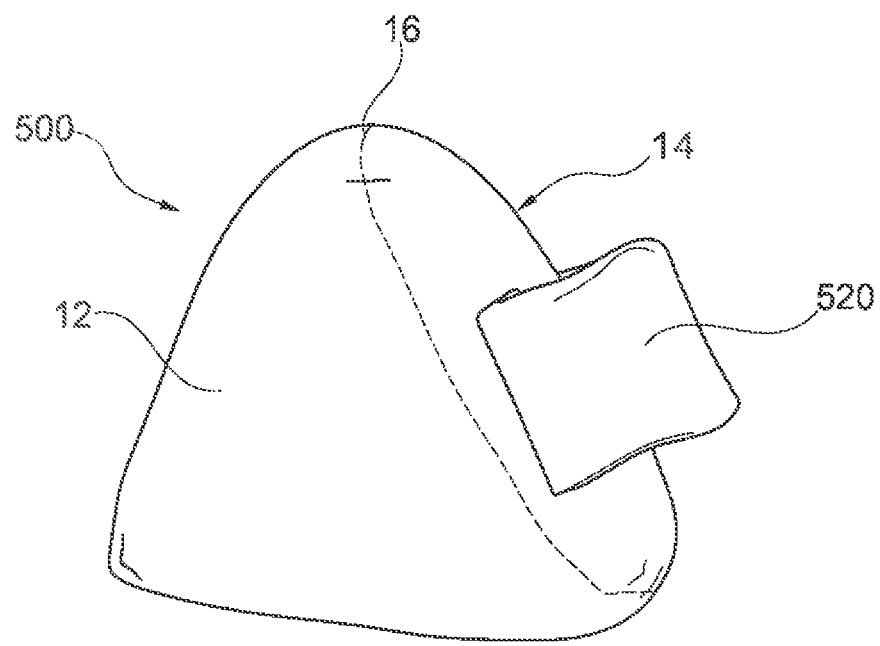
Figure 20:
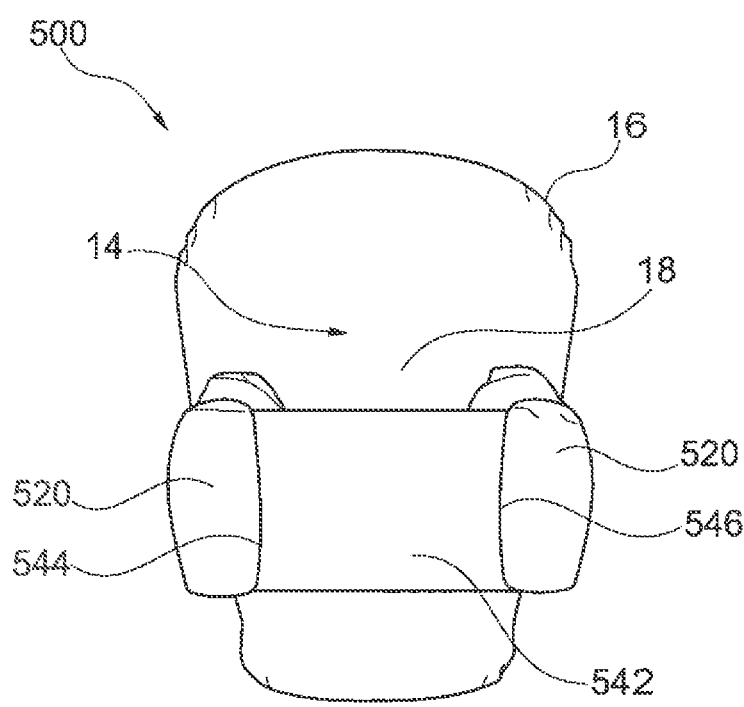
Figure 21:
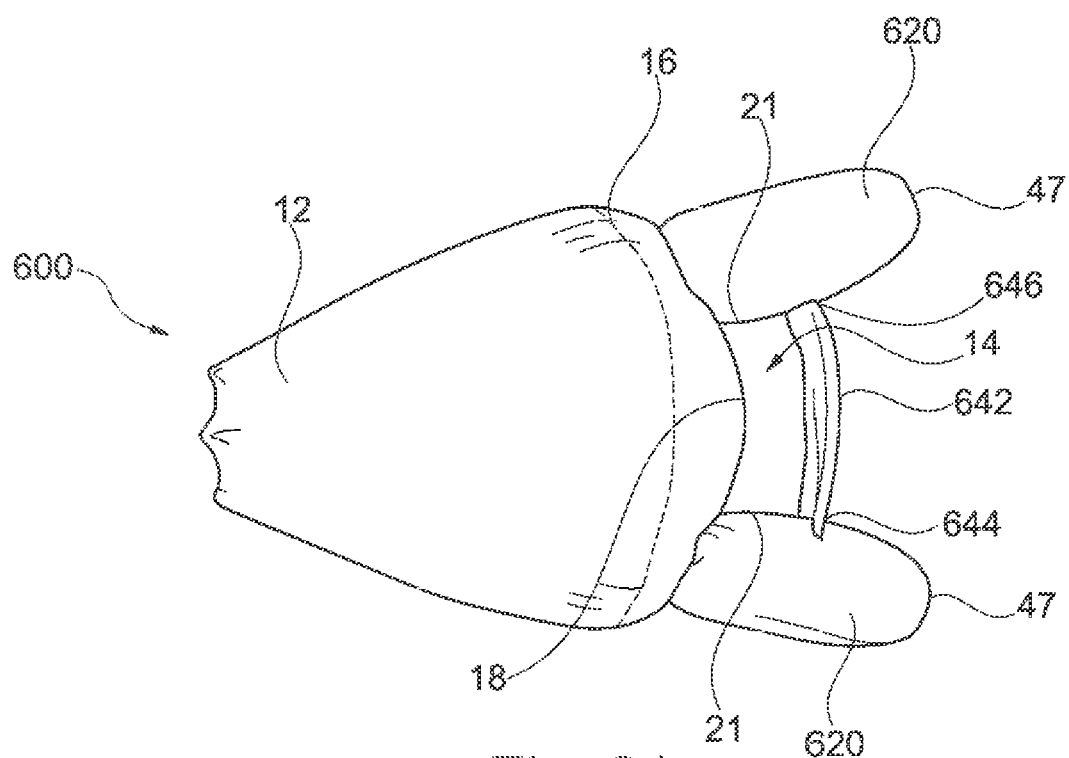
FIGS. 21 to 24 show schematic perspective views of an airbag according to the invention in the inflated state in accordance with a seventh embodiment.
Figure 22:
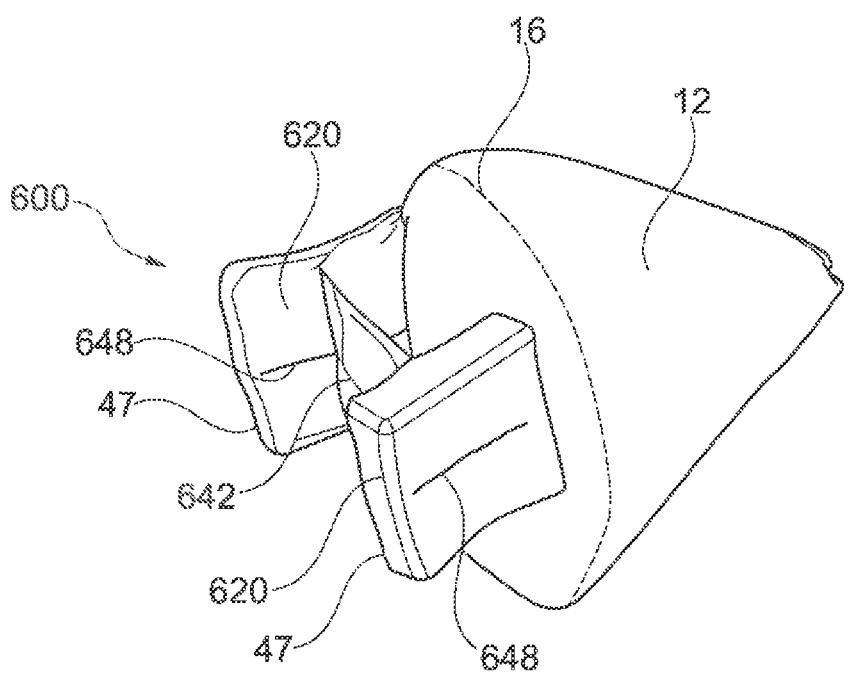
Figure 23:
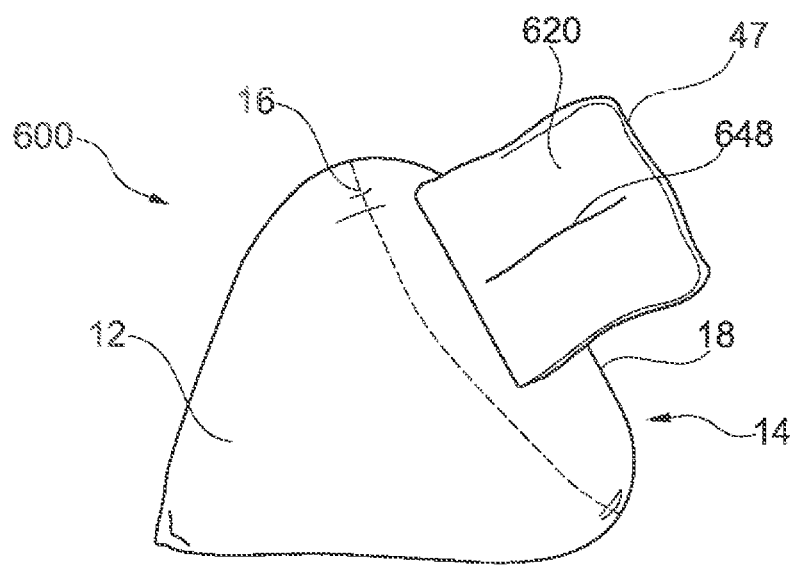
Figure 24:
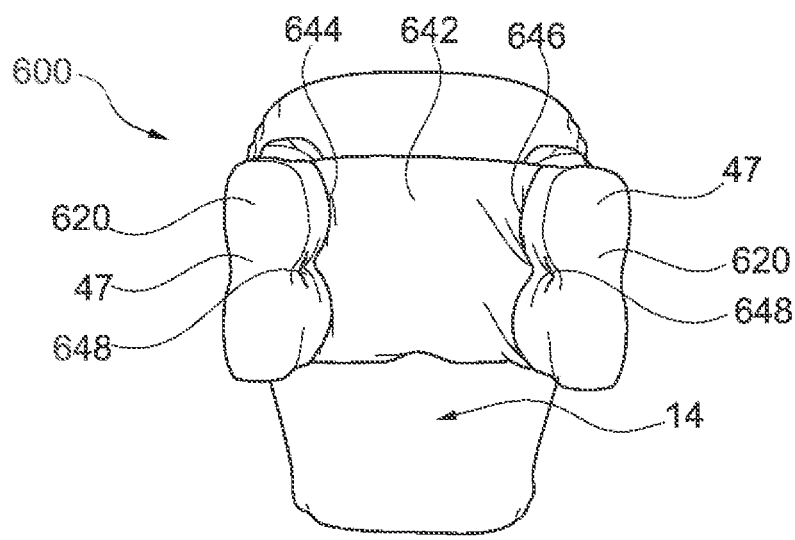

FIGS. 10 to 12 illustrate a fourth embodiment of an airbag 300.

The airbag 300 substantially corresponds to the afore-described airbag 200 of the third embodiment, the difference residing in the fact that two bulges 320 are provided each being formed laterally next to the central surface portion 16 of the baffle surface 14.

Just as in the second embodiment, the baffle surface 14 is composed of three cut parts 323a, 328b, 323c. The central cut part 328a is formed mirror-symmetrically relative to an imaginary center line M, while the two outer cut parts 328b, 328c are mirror-symmetrical to each other relative to the center line M. In this case, the two outer cut parts 328b, 328c are substantially identical to the cut part 228b of the third embodiment (the cut part 328c being mirror-inverted relative to the cut part 228b).

The central cut part 328a includes two inner edges 330 each extending mirror-inverted to the respective inner edge 330 of the outer cut parts 328b, 323c. The adjacent cut parts 328a, 328b and 328a, 328c are interconnected over the entire length of the inner edges 330. The shape of the convex areas 332 of the inner edges 330, of the inner tethers 36 and of the joint 348 corresponds to that of the latter embodiment so that this shall not be discussed in detail here.

The second outer tether 342 in this case takes a shape corresponding to that of the outer tether 242 which was additionally mirrored at its long side at the end 244. The outer tether 342 is fixed by the center line 344 formed in this way in the middle of the central cut part 328a, in the finished airbag 300 in the middle of the central surface portion 18, on a fastening point 352.

The two free ends 346 of the outer tether 342 are fastened, just as the free ends 246 of the tether 242 of the third embodiment, at the respective points 34 of the convex areas 332 between the individual cut parts in the connection of the inner edges 330 thereof.

FIG. 11 and FIG. 8 further show, illustrated by arrows, the gas flow inside the airbag 200 and, resp., 300 from an inflating orifice 251 via which gas flows from an inflator (not shown) into the airbag 200, 300 and flows from a main volume of the airbag 200, 300 into the bulge 220, 320 up to the compartment 250, 350 formed by the joint 248, 343.

FIGS. 13 to 16 show a fifth embodiment of a front head/torso airbag 400.

Just as in the third embodiment, the airbag 400 includes only one single bulge 420 which is formed, related to the mounted inflated state, at a side of the baffle surface 14.

An outer tether 442 extends from the outermost point 47 of the bulge 420, i.e. the outermost side contrary to the driving direction, as in the third embodiment in the direction of the baffle surface 14. One of the free ends 446 of the outer tether 442 may act directly on the outermost point 47, as described for the preceding embodiments, but may as well be fixed offset somewhat toward the baffle surface 14 along the wall portion 21 facing the baffle surface 14. The other free end 444 is not fixed on the central surface portion 18 of the baffle surface 14 itself, however, but extends further e.g. up to the peripheral edge 16 on the opposite side of the baffle surface 14 and is fastened there, for example on a seam connecting the baffle surface 14 to the cover part 12.

The outer tether 442 may be trapezoidal, as afore-described, but may as well be e.g. rectangular.

In this example, no joint is provided between the wall portions 49 of the bulge 420, as this is the case in the third embodiment, it would be possible, however, to confer this feature also to the airbag 400 of the fifth embodiment, if an occupants head strikes the outer tether 442, the latter is forced toward the baffle surface 14 and thus swivels the bulge 420 more closely toward the head so that the head is fixed even better in position.

FIGS. 17 to 20 illustrate a sixth embodiment of a front head/torso airbag 500.

At the sides of the baffle surface 14 two bulges 520 are provided similarly to the airbag 300 of the afore-described fourth embodiment.

Equally just as in the fourth embodiment, an outer tether 542 is provided the two free ends 544, 546 of which are fixed to the bulges 520. The fixation may take place, as described for the latter embodiment, at the respective outermost points 47 or may be offset somewhat to the respective wall portion 21 which is directed toward the baffle surface 14 and, resp., toward the opposite bulge 520.

In contrast to the fourth embodiment, the outer tether 542 is not connected to the baffle surface 14, however, but extends freely between the two bulges 520.

In the fully inflated but unloaded position of the airbag 500 as shown in the Figures, the outer tether 542 all around has a distance from the baffle surface 14. When the occupant 22 strikes the outer tether 542, the latter may be forced onto the baffle surface 14, especially onto the central surface portion 18 thereof, so that the vehicle occupant 22 is actually absorbed by the baffle surface 14. The bulges 520 are swiveled toward the occupant's head.

FIGS. 21 to 24 illustrate a seventh embodiment of a front head/torso airbag 600.

This embodiment is very similar to the afore-described sixth embodiment as described just before, in contrast to this, the outer tether 642 extending freely between two bulges 620 also in this case is not arranged in the area of the outermost points 47 of the bulges 620 but approximately in the middle of the inner wall portions 21 of the bulges 620 between the outermost points 47 and the transition of the respective bulge 620 into the baffle surface 14 so that the bulges 620 project from the outer tether 642 in the direction away from the baffle surface 14 over the ends 644, 646.

Moreover, in this case the two wall portions 21 of each of the bulges 620 are interconnected by joints 648, e.g. darts. In contrast to the afore-described embodiments, the joint 648 extends in the direction of the longitudinal extension of the bulges 620, viz, away from the baffle surface 14, however, so that each of the bulges 620 is subdivided into two juxtaposed compartments, thus increasing the stability especially in the plane in which the tether 642 is located.

At the discretion of those skilled in the art, each of the features described in the different embodiments may also be conferred upon other embodiments at will, as a matter of course. This is especially applicable to the provision of joints and inner tethers or to the shape and arrangement of the outer tethers.

The invention claimed is:

1. A front head/torso airbag (10; 200; 300; 400; 500; 600) of a vehicle occupant restraint system comprising a cover surface (12) and a baffle surface (14) forming a contact face for the vehicle occupant (22) which merges into the cover surface (12), wherein in an inflated state of the airbag (10; 200; 300; 400; 500; 600) when being in a mounted position, the baffle surface (14) includes a central surface portion (18) and laterally adjacent thereto at least one bulge (20; 220; 320; 420; 520; 620) projecting from the central surface portion (18) for laterally protecting the head (24), wherein an inner tether (36) interconnects two wall portions (21) of the at least one bulge (20; 220; 320) of the airbag and extends in an interior of the airbag (10; 200; 300).

2. The front head/torso airbag according to claim 1, wherein the baffle surface (14) is configured so that, in the case of contact of the vehicle occupant (22) with the central surface portion (18), the at least one bulge (20; 220; 320; 420; 520; 620) is located on the side of the head (24) of the occupant (22).

3. The front head/torso airbag according to claim 1, wherein two bulges (320; 520; 620) are provided which are arranged on opposite sides of the central surface portion (18) and which are facing each other.

4. The front head/torso airbag according to claim 1, wherein the baffle surface (14) is composed of at least two cut parts (28a, 28b; 128a, 128b, 128c; 228a, 228b; 328a, 328b, 328c) each of which is delimited by a portion (16a, 16b, 16c) of a peripheral edge (16) of the baffle surface (14) as well as by at least one inner edge (30; 130; 230; 330) at which the cut parts (28a, 28b; 128a, 128b, 128c; 228a, 228b; 328a, 328b, 328c) of the baffle surface (14) are fastened to each other, wherein each of the inner edges (30; 130; 230; 330) of adjacent cut parts (28a, 28b; 128a, 128b, 128c; 228a, 228b; 328a, 328b, 328c) of the baffle surface (14) pointing toward each other includes a convex area (32; 132; 232; 332) and the convex area (32; 132; 232; 332) helps to define the bulge (20; 220; 320).

5. The front head/torso airbag according to claim 4, wherein the baffle surface (14) is composed of exactly three cut parts (128a, 128b, 128c; 328a, 328b, 328c) and a central one of the three cut parts (128a, 328a) of the baffle surface (14) is configured to be mirror-symmetrical to an imaginary center line (M) and both outer cut parts (128b, 128c; 328b, 328c) are configured to be mirror-symmetrical relative to each other.

6. The front head/torso airbag according claim 4, wherein the tether (36) is fastened in the area (40) of an imaginary line (S) through the intersections of the inner edge (30; 130; 230; 330) of the cut part (28a, 28b; 128a, 128b, 128c; 228a, 228b; 328a, 328b, 328c) with a portion (16a, 16b, 16c) of the peripheral edge (16) of the assigned cut part (28a, 28b; 128a, 128b, 128c; 228a, 228b; 328a, 328b, 328c).

7. The front head/torso airbag according to claim 1, wherein an outer tether (242; 342; 442; 542; 642) is provided on the outside of the airbag (200; 300).

8. The front head/torso airbag according to claim 7, wherein the outer tether (242; 342; 442; 542; 642) is fixed to the bulge (220; 320; 420; 520; 620) and to the baffle surface (14) or in the area of a transition of the baffle surface (14) to the cover surface (12).

9. The front head/torso airbag according to claim 7, wherein the outer tether (242; 342; 442; 542) is fixed in the area of an outermost point (47) of the bulge (220; 320; 420; 520) in the inflated airbag (200; 300; 400; 500).

10. The front head/torso airbag according to claim 7, wherein the outer tether (642) is fixed to the bulge (620) between an outermost point (47) and a transition of the bulge (620) in the baffle surface (14).

11. The front head/torso airbag according to claim 7, wherein the outer tether (342; 542; 642) extends between two bulges (320; 520; 620) and is fastened to the bulges (320; 520; 620).

12. The front head/torso airbag according to claim 11, wherein the tether (542; 642) extends freely between the bulges (520; 620) or is fastened between the bulges to the cover surface (12).

13. The front head/torso airbag according to claim 1, wherein in the area of the bulge (220; 320) adjacent cut parts (228a, 228b; 328a, 328b, 328c) of the baffle surface (14) are fastened directly to each other at a joint (248; 348).

14. The front head/torso airbag according to claim 13, wherein in the inflated state of the airbag (200; 300) the bulge (220; 320) is bent at the joint (248; 348) in the direction of the middle of the central surface portion (18) of the baffle surface (14).

* * * * *